US012692719B2

(12) United States Patent
Caterino et al.

(10) Patent No.: US 12,692,719 B2
(45) Date of Patent: Jul. 28, 2026

(54) SMART DOOR LOCK INTEGRATED AIR CHANNEL TO MOUNTING BRACKET FOR VENTILATION

(71) Applicant: MASTER LOCK COMPANY LLC, Oak Creek, WI (US)

(72) Inventors: Mark Caterino, Prospect, CT (US); Vu Nguyen, Farmington, CT (US); Wai P. Wong, Orange, CT (US)

(73) Assignee: MASTER LOCK COMPANY LLC, Oak Creek, WI (US)

(*) Notice: Subject to any disclaimer, the term of this patent is extended or adjusted under 35 U.S.C. 154(b) by 0 days.

(21) Appl. No.: 18/198,428

(22) Filed: May 17, 2023

(65) Prior Publication Data

US 2024/0076901 A1 Mar. 7, 2024

Related U.S. Application Data

(60) Provisional application No. 63/404,084, filed on Sep. 6, 2022.

(51) Int. Cl.
*E05B 17/00* (2006.01)
*E05B 9/08* (2006.01)

(52) U.S. Cl.
CPC .............. *E05B 17/002* (2013.01); *E05B 9/08* (2013.01)

(58) Field of Classification Search
CPC ... E05B 3/06; E05B 9/08; E05B 9/082; E05B 2009/002; E05B 2009/004; E05B 17/002
See application file for complete search history.

(56) References Cited

U.S. PATENT DOCUMENTS

| | | | |
|---|---|---|---|
| 6,877,346 B1 | 4/2005 | Finkelstein | |
| 8,490,445 B2 | 7/2013 | Chiou | |
| 10,808,420 B2 | 10/2020 | Morstatt et al. | |
| 2006/0279095 A1 | 12/2006 | Ishiguro | |
| 2010/0269554 A1 | 10/2010 | Mak | |
| 2015/0308157 A1 | 10/2015 | Lin | |
| 2023/0220701 A1* | 7/2023 | Mohammed | E05B 3/065 |
| 2023/0243186 A1* | 8/2023 | LeBlanc | G07C 9/00674 70/278.1 |

* cited by examiner

*Primary Examiner* — Christine M Mills
*Assistant Examiner* — Yahya Sidky
(74) *Attorney, Agent, or Firm* — Calfee, Halter & Griswold LLP

(57) ABSTRACT

An air channel is utilized to ventilate a door lock for the purpose of reducing the condensation of warm, humid, air within the lock. The air channel is configured to be located between a surface mounted door lock and the door panel and vent the space between the interior and exterior locks, including the door bore. In some embodiments, the air channel is formed into the mounting bracket for the interior door lock. The air channel may be implemented to reduce condensation without requiring seals or gaskets between the interior and exterior locks.

18 Claims, 7 Drawing Sheets

SMART DOOR LOCK INTEGRATED AIR CHANNEL TO MOUNTING BRACKET FOR VENTILATION

CROSS-REFERENCE TO RELATED APPLICATIONS

This application claims the benefit under 35 U.S.C. § 119(e) to U.S. Provisional Application Ser. No. 63/404,084, titled SMART DOOR LOCK INTEGRATED AIR CHANNEL TO MOUNTING BRACKET FOR VENTILATION," filed Sep. 6, 2022, which is herein incorporated by reference in its entirety.

FIELD

The present disclosure relates generally to door locks and in particular to door locks with air channel ventilation.

BACKGROUND

Aspects described herein relate to improvements in door locks. Door lock assemblies typically include an exterior lock configured to be mounted on the outside or unsecured side of the door; an interior lock configured to be mounted to an inside of a door; and a dead bolt and/or latch assembly, depending on application, mounted to the door. Within the latch or deadbolt, a sliding member can traverse within the door and extend therefrom so that it may partially enter the door jamb to prevent the door from opening. The exterior lock of the lock assembly may contain key openings, touchpads, and/or other interface for a user to present a key, passcode, or any other credential to unlock the lock.

BRIEF SUMMARY

According to one aspect, a door lock assembly is provided. The door lock assembly includes an exterior lock configured to be mounted on an outside of a door panel, an interior lock configured to be mounted on an inside of a door panel and configured to function cooperatively with the exterior lock and, a flow passage disposed between the interior lock and the inside of the door panel or an exterior lock and the outside of the door panel. The flow passage is configured to vent a space bounded by the door panel, the interior lock and the exterior lock.

According to another aspect, a mount for a door lock is provided. The mount comprises a mounting bracket configured to sit on a surface of a door panel and further configured to hold a door lock to the surface of the door panel and one or more depressed channels disposed along a door-facing side of the bracket. The door-facing side of the bracket is configured to contact a portion of the surface of the door panel. The depressed channels are configured to allow the movement of air between the surface of door panel and the door-facing side of a door lock, thereby reducing an infiltration of air into the lock from the door-facing side.

According to yet another aspect, a door is provided. The door comprises a door panel configured to enclose a doorway of a secured space from an unsecured space, an interior side of the door facing the secured space, and an exterior side of the door facing the unsecured space. A bore hole is provided in the door panel between the interior side of the door and the exterior side of the door. A lock is configured to mount to the door panel over the bore hole on the interior side of the door or the exterior side of the door. At least one air channel is disposed between the lock and an adjacent surface of the door panel. The air channel is configured to allow air to flow between the bore hole and an environment surrounding the lock.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various nonlimiting embodiments when considered in conjunction with the accompanying figures.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein. In the drawings.

DETAILED DESCRIPTION

Figure 1:
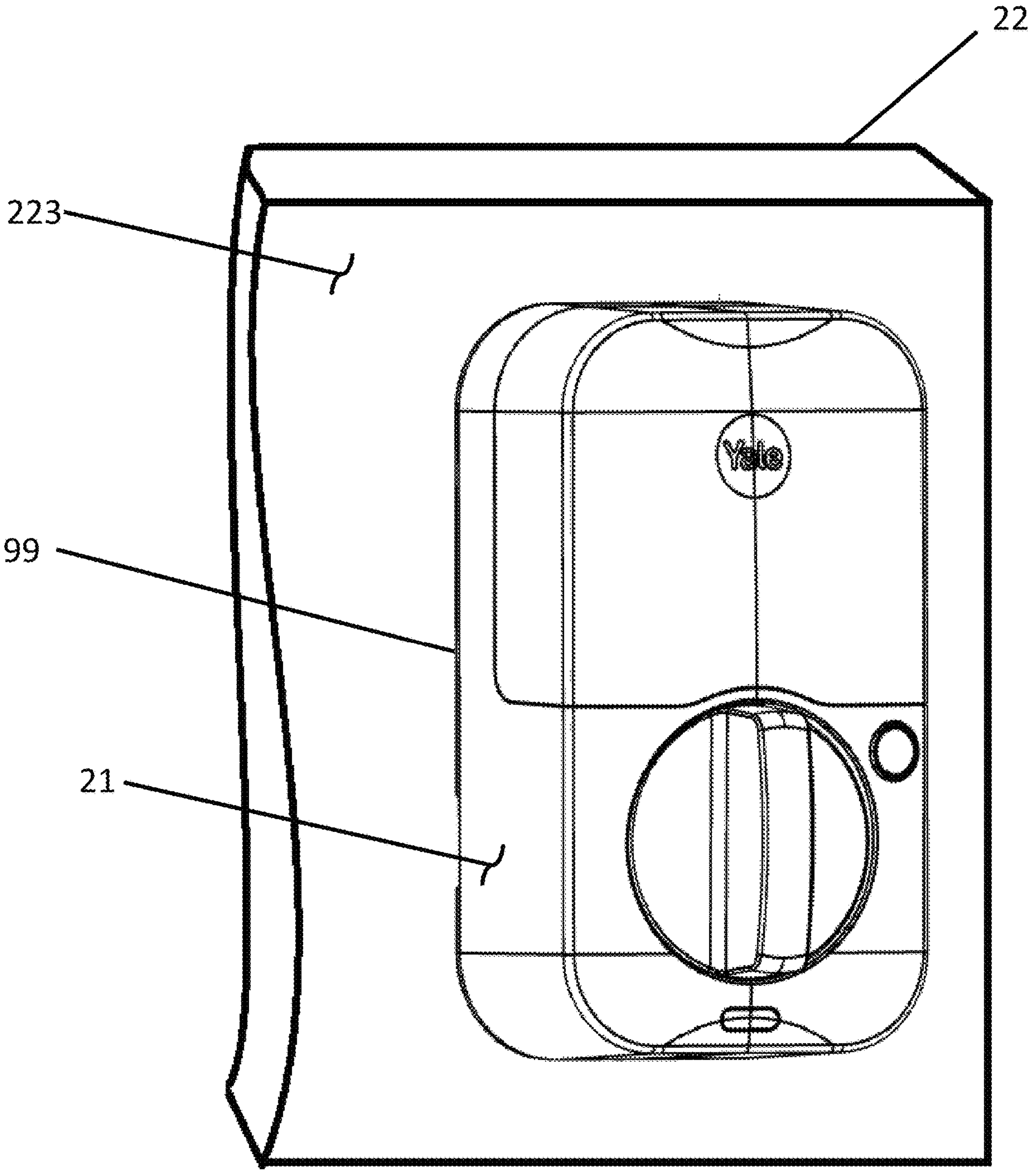
FIG. 1 is an exterior facing perspective view of a first embodiment of an interior lock mounted to a door.

Door lock assemblies typically include an exterior lock configured to be mounted on the outside of a door; an interior lock configured to be mounted on the inside of the same door. The exterior lock is often exposed to ambient outdoor weather conditions including temperature and humidity. The interior lock is typically at or near the interior temperature of the locked space, which may be air-conditioned or climate controlled in many applications. The difference in temperature between the interior and exterior locks creates an opportunity for condensation to form in the lock located on the "cool" side of the door. In many cases, the condensation forms within the interior portion of the lock. The Inventors have recognized solutions to the problem of condensation forming within the enclosure or "cabinet" of a door lock.

Aspects described herein relate to improvements in door lock assemblies by including air channels in the door lock assembly for the purpose of reducing the formation of condensation within a lock and reducing lock assembly failures caused thereby. Air channels that form passages for fluid flow are included within a lock assembly to ventilate the space between a door lock and a door panel. Flow passages formed by the air channels allow humid air to escape through the channels to reduce or prevent infiltration into the lock. The flow passages may additionally allow for the drainage of condensed water or to convey a supply of non-saturated air to aid the re-evaporation of condensate.

In many embodiments, a door lock is fastened to a door panel over a bore hole running through the door. The interior lock is located over the bore hole on the interior side. The exterior lock is located over the bore hole on the exterior side. The interior and the exterior locks may enter the bore hole either separately or together. The interior and exterior locks may be configured to fasten together by one or more screws or bolts clamping the door therebetween and securing the lock. The screws or bolts are fastened from the interior lock to the exterior lock such that an intruder could not easily disassemble or break the enclosure of the exterior lock to access the heads of the fasteners and remove the lock. In a conventional lock, the volume of air existing within the bore hole is typically ventilated only by leakage paths existing between the door and the lock, between the door and the deadbolt, or within the lock itself.

The interior lock of the lock assembly includes a mounting bracket that receives the screws or bolts previously described. The mounting bracket is secured over the door bore hole thereby such the mounting bracket secures the lock to the door on the interior side. Other components of the interior lock are then fastened to the mounting bracket directly or through intermediate components themselves fastened to the mounting bracket.

The exterior lock may contain key openings (key holes), touchpads, and/or other interfaces for a user to present a key, passcode, or any other credential to cause the lock to operate. Openings such as key openings may allow outside air to enter the exterior lock. Once inside the exterior lock enclosure, the air may pass into the door bore hole and enter the interior lock from the door side. When the temperature and humidity are higher on the exterior side of the door, the flow path previously described may lead to condensation forming inside of the interior lock. Moisture from condensation may result in corrosion to components within the lock. Furthermore, in electronically operated locks, the electronics controlling the lock assembly are often located within the interior lock. Moisture from condensation may result in degradation to electronic components including circuit boards, battery terminals and connectors and may additionally lead to current leakage or "short circuits" that could impede the operation of the lock assembly.

The inventors have recognized that many door lock installations do not seal the space within the door bore hole or between the door bore and the interior portion of the lock. Sealing the interior lock from the door bore or exterior portion would require sealing around one or more screws or bolts that hold the lock assembly together, sealing a shaft or mechanical connection between the exterior and exterior locks and often sealing around wired connections between the interior and exterior locks. Including seals would increase the cost of the lock and may require specialized installation techniques that could prevent a user from being able to install lock assemblies in the field. The seal could wear in service and present a weakness to the reliability of the lock assembly. Furthermore, a seal may not be suitable for all types of door into which a lock may be installed, for instance doors made of porous materials (such as wood) or doors with certain surface textures may negate the effectiveness of a seal. The air channels disclosed herein do not require seals or gaskets between locks or between a lock and a door.

The inventors have recognized improvements to door locks to reduce the likelihood of condensation related lock failures. Embodiments disclosed herein relate to improvements in ventilation and mounting of the lock assembly. For example, in one embodiment air channels are included in the mounting bracket to reduce the likelihood of air passing between the door bore hole and the interior lock. Other embodiments include openings in the lock cover to enhance ventilation. Without wishing to be bound by theory, the air channel provides a flow path that is less tortuous than the leakage paths existing within a sealed or unsealed lock assembly, therefore a significant majority of air escaping from the door bore hole will escape via the air channel and only a small portion, if any, will leak into the lock and potentially condense.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows a first embodiment of an interior door lock 99 mounted to the inner surface 223 of door panel 22. Cover 21 encloses the mechanism of the lock.

Figure 2:
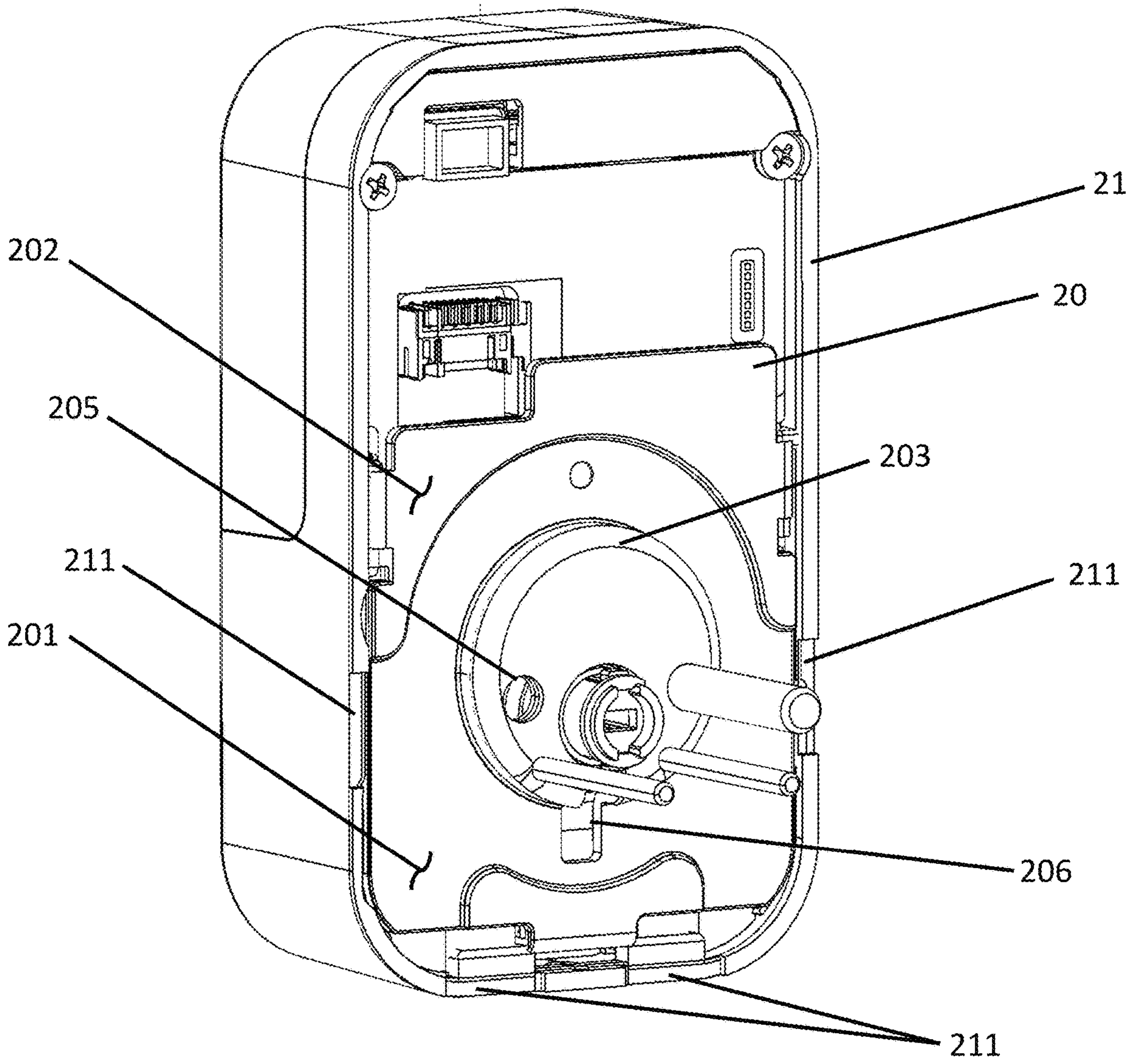
FIG. 2 is an interior facing perspective view of a first embodiment of an interior lock.

FIG. 2 shows an interior facing view the interior door lock of FIG. 1. Air channel 201 is illustrated in mounting bracket 20. The lock assembly is configured to mount on the interior portion of a door such that the mounting surface 202 abuts the interior surface of the door panel. Boss 203 is configured to partially enter the bore hole of a door when the door lock assembly is mounted thereon. Boss 203 is of a diameter at least slightly smaller than the door bore hole (See FIG. 4, 221) so that there exists a passage for air to move between the bore hole and the boss. When mounted, the surface of the door panel and the air channel 201 create a flow passage through which air can move from the bore hole to the environment or from the environment to the bore hole. Openings 211 allow air to pass from the air channel into the environment surrounding the lock assembly. It should be understood that the air channels in the illustrated embodiment do not represent to only possible arrangement of air channels and that more or fewer air channels may be used and air channels may run in directions other than those described or illustrated herein. The illustrated embodiment does not include any air channels or cover notched openings on the top surface of the lock to limit the infiltration of liquid water should it be present.

Figure 3A:
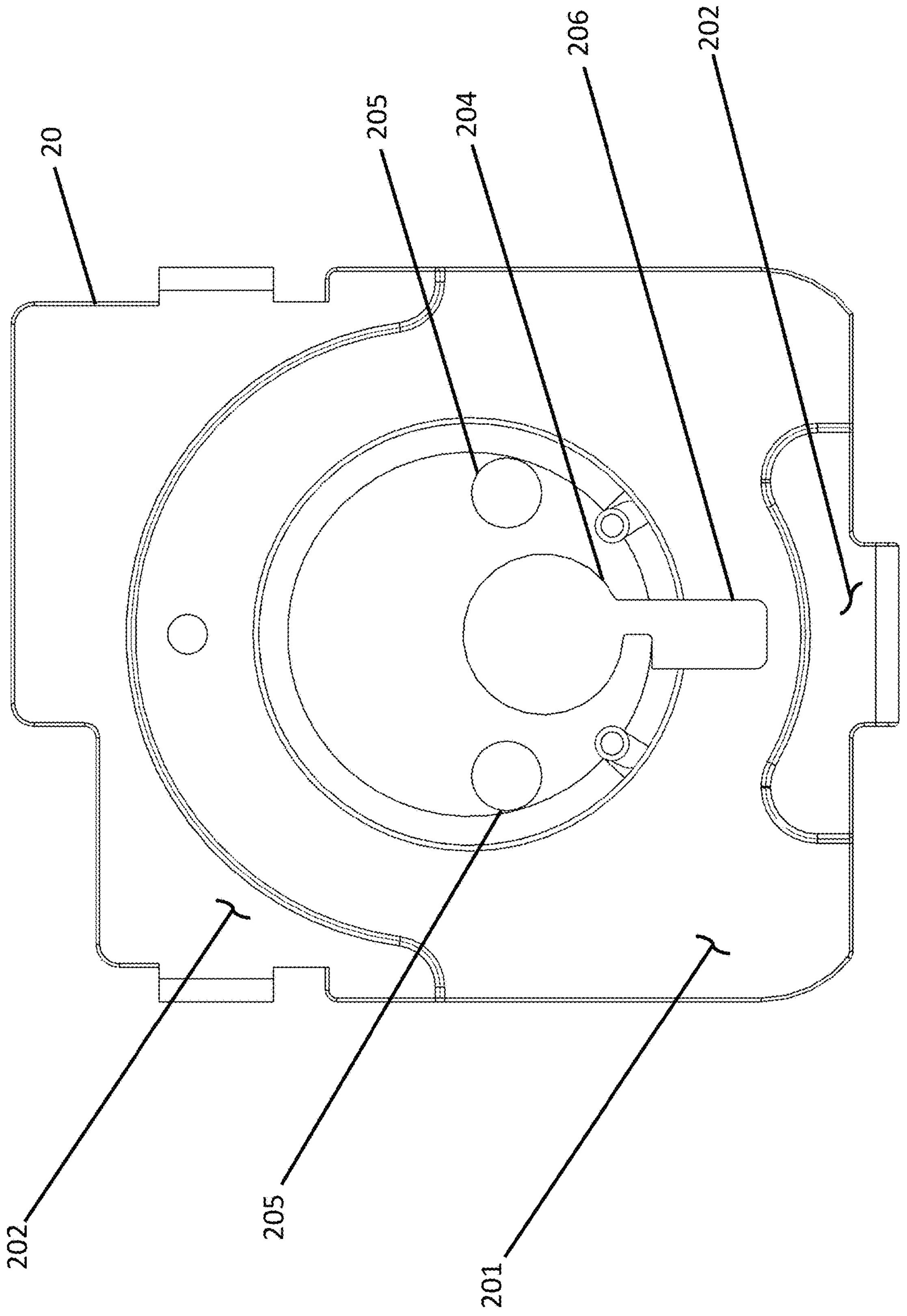
FIG. 3*a* is an interior facing view of a door lock mounting bracket of a first embodiment of a lock.
Figure 3B:
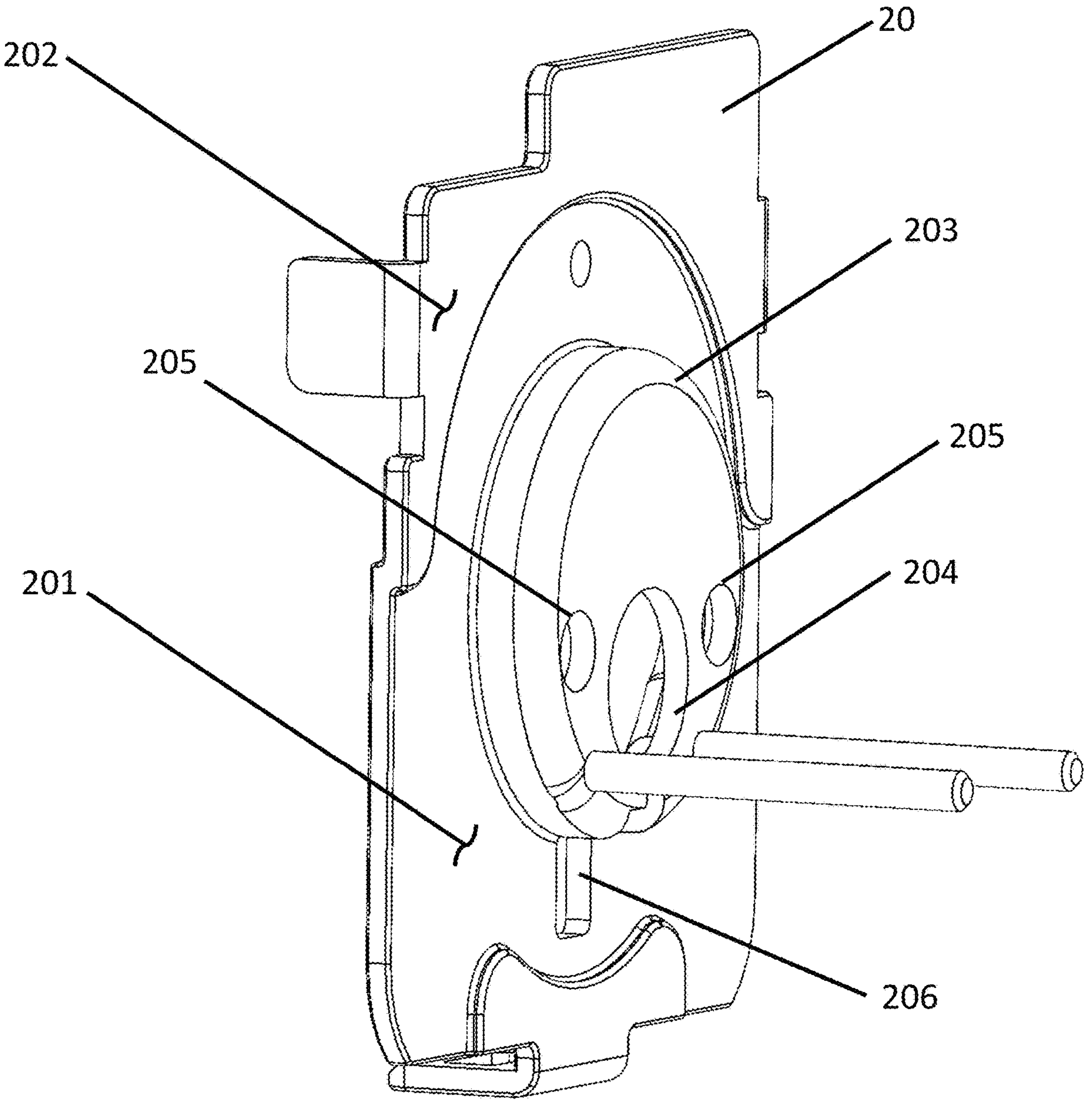
FIG. 3*b* is an interior facing perspective view of the door lock mounting bracket of FIG. 3*a*.

FIGS. 3*a* and 3*b* illustrate views of the mounting bracket used in the second embodiment of the door lock. In this embodiment the bracket is stamped steel, although other materials and manufacturing processes are contemplated. Holes 205 are included for the mounting screws to pass from the interior side of the mounting bracket through the door bore and then into threaded features within the exterior lock such that the lock is configured to clamp itself to the door through the door bore hole. Heads of the mounting screws are then on the interior side of the mounting bracket on the interior side of the door, such that the lock may not be disassembled from the exterior side. The remaining components of the interior lock are carried by the mounting bracket 20, either being directly fastened to the mounting bracket or fastened to it through intermediate components. Hole 204 is provided for a shaft to pass through the plate, the purpose of the shaft being to mechanically couple the operation of the interior lock and the exterior lock. A wire passage 206 is provided to route wires that may connect the electrical components of the interior lock to devices such as keypads or card readers that are provided for users to present credentials on the exterior lock. The inclusion of the air channel feature allows the lock to operate without the requirement to seal the passages included in the lock mounting bracket or covers.

Figure 4:
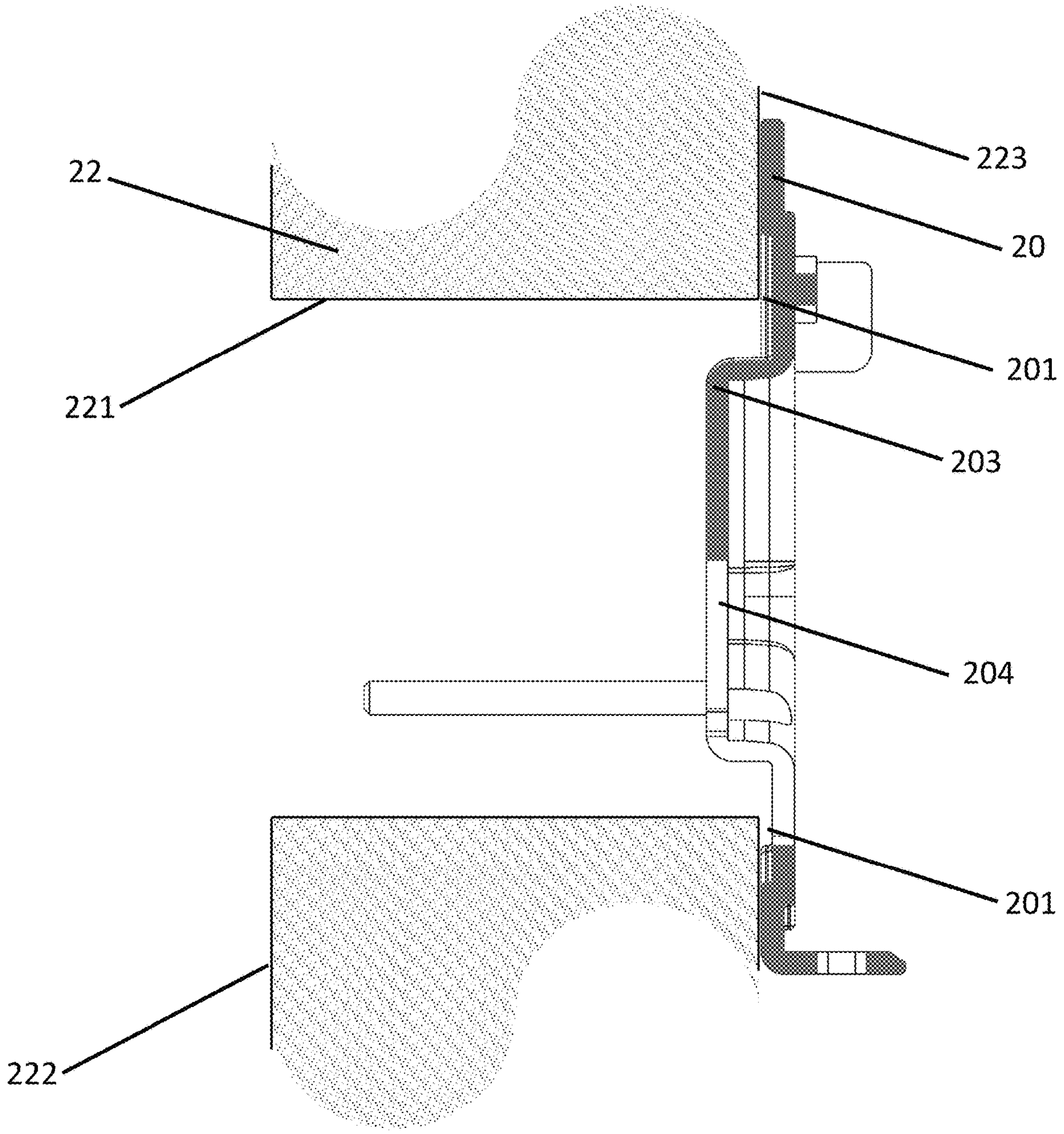
FIG. 4 is a section view of the door lock bracket of FIGS. 3*a* and 3*b* shown mounted on a door.

FIG. 4 shows mounting bracket 20 as it would sit when installed onto door 23. Door 23 consists of an interior face of the door panel, 223, and exterior face of the door panel, 222, and a bore hole 221 extending therebetween. Installed to the door, mounting bracket 203 partially enters bore hole 221. Clearance between the boss 203 and bore hole 221 allows for air to pass from the bore hole into the air channel 201 bounded by the stamped bracket 20 and the inside surface of the door, 223. Although the illustrated mounting bracket is from the first embodiment presented, the features described with respect to this embodiment would operate in the same way with any of the other illustrated embodiments. Other embodiments are also contemplated. The exterior lock is not illustrated for the purposes of clarity. Also omitted are the mounting screws, and the mechanical and electrical connections between the interior and exterior locks.

Figure 5:
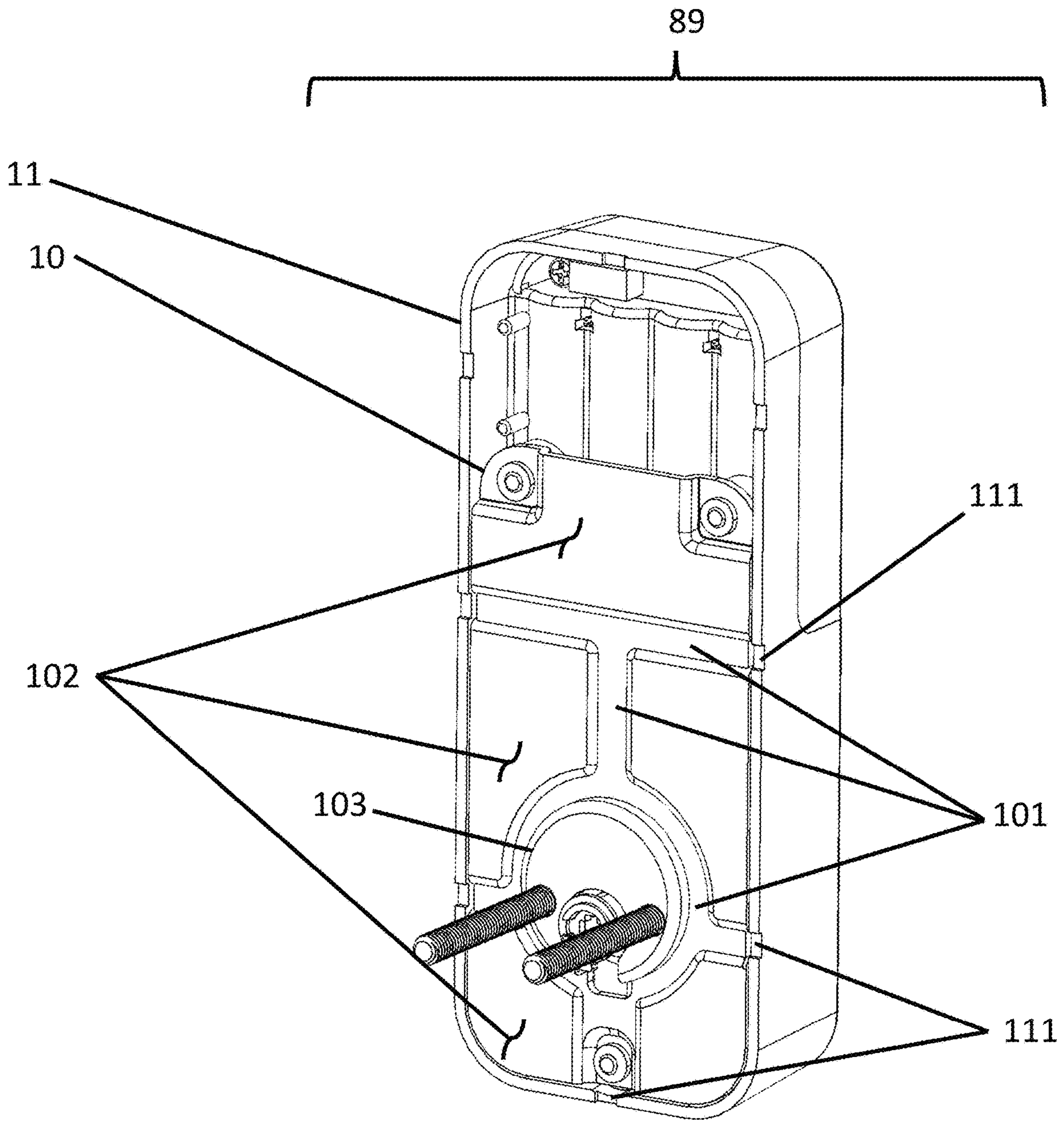
FIG. 5 is an interior facing perspective view of a second embodiment of an interior lock.

FIG. 5 illustrates another embodiment of an interior door lock 89 including mounting bracket 10 and cover 11. The mounting bracket 10 further comprises air channels 101 and mounting surface 102 where the mounting bracket abuts the interior surface of a door when the interior portion of the lock assembly is mounted. The surface of the door panel (not shown in FIG. 5) forms a plane coincident with mounting surface 102 across the mounting bracket. The air channels, 101 are depressed into the mounting bracket 10 such that when the mounting bracket is secured to the inside surface of a door, channels 101 remain as flow passages of a substantially rectangular cross section and are unimpeded to flow that may exist along the channel in a direction parallel to the face of the door. Boss 103 extends above the mounting surface 102 and is configured to enter a bore hole of a door when the lock assembly is mounted thereon. Boss 103 is of a diameter that is at least slightly smaller than the bore hole of the door. Air may flow from the bore hole, around boss 103 to enter a portion of channel 101 that encircles boss 103. Airflow may then continue to one of the horizontal or vertical portions of air channel 101 that lead away from the bore hole. Notched openings 111 in cover 11 are located where the channels 101 meet the outer perimeter of the mounting bracket 10. Notches 11 allow air to move from the channel to the environment around the interior portion of the lock 89. The vertical air channel may additionally allow any condensate that has formed to run out the bottom of the lock.

Figure 6:
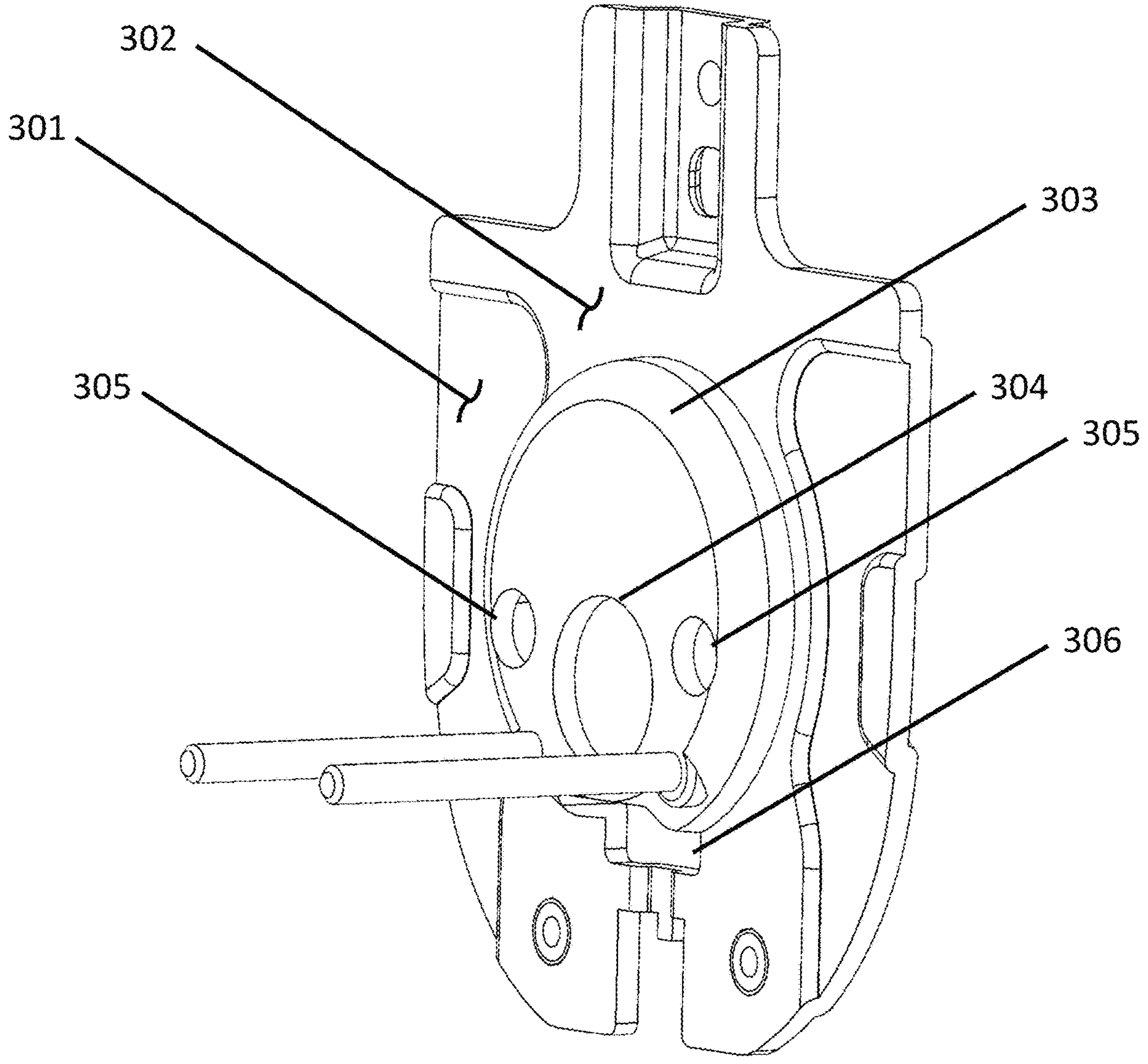
FIG. 6 is an interior facing perspective view of a door lock mounting bracket of a third embodiment.

FIG. 6 illustrates an interior facing perspective view of the mounting bracket 30 for a third embodiment of the door lock. Air channels 301 are positioned bilateral of boss 303 which is configured to partially enter a bore hole when mounting surface 302 is mounted against the interior surface of a door panel. Holes 304 and 305 are included for coupling and mechanically fastening the interior lock to the exterior lock. Opening 306 is provided to route wires. The mounting bracket 30 is configured to fasten to the exterior lock as described in the previous embodiments. Likewise, the interior lock mechanism is supported by the mounting bracket. As illustrated by this embodiment, it is not necessary for the air channels to encircle boss 303, nor is it necessary for the air channel(s) to form a single or continuous interconnected network of passages.

In other embodiments, more or fewer air channels may be included on the mounting bracket including channels extending radially from the door bore boss. In some embodiments the entire region around the door bore boss may serve as an air channel, the mounting bracket being held off from the door by feet or standoffs which comprise a small fraction of the surface area of the mounting bracket. Although a stamped steel construction is employed in the three illustrated embodiments, other construction methods are contemplated including machined mounting brackets, cast metal mounting brackets, molded polymer or reinforced polymer mounting brackets, and mounting brackets where the air channels are a formed of initially separate pieces that are bonded or fastened to the mounting bracket.

While the embodiments illustrated are configured to reduce condensation within the interior lock, the inventors recognize that aspects disclosed herein could also be used to reduce condensation within the exterior lock. This could be done to reduce condensation or icing when the lock is to be used in a cold climate. Additionally, the aspects disclosed herein could be useful for preventing condensation in the exterior lock where the interior lock is in a warm humid environment such as a sauna, indoor swimming pool room, or greenhouse. If the intended use is to prevent condensation on the exterior side, the air channels could be formed in a door-facing rear cover of the exterior lock.

The channels do not need to be disposed on a mounting bracket or structural member of the lock. In some embodiments, the air channels can be made as a separate component that may be included between the lock and the exterior or interior surface of a door panel. The air channels may be constructed of metal, polymer, elastomer, composite or other suitable materials. As a separate piece, the air channels may be formed into a decorative cover or escutcheon. A decorative cover or escutcheon with air channels may have additional purposes such as be used to cover abandoned holes left in an old door when a new lock assembly is installed. In other embodiments, the air channel could be formed to extend below the surface of the door and may be located on or within the door panel.

In the embodiments previously described, air channels may be provided without including a watertight seal between the interior lock and the door/bore hole or between the door/bore hole and the exterior lock. In other embodiments, the air channels could be implemented in addition with seals or gaskets. Seals may be implemented between the door bore and any part of the lock assembly and also between the door surface and any portion of the lock assembly that does not include air channels.

In embodiments where the air channel is formed as a separate component, seals or gaskets may be incorporated into the air channel component. In other embodiments where the air channels are incorporated into the mounting bracket, seals or gaskets may be incorporated with the mounting bracket and may include sealing surfaces between the mounting bracket and the lock. Gaskets may be used separately or in combination with seals around shafts, fasteners, and wires that may exist on the door-facing side of the lock.

Where used, the term "interior" should be interpreted to mean on the side of or toward the secured space. The term "exterior" should be interpreted as on the side of or toward the unsecured space. The term "panel" in the context of a "door panel" should be interpreted to mean the entire door exclusive of the lock assembly and mounting hardware. A door panel should not be interpreted as being limited to doors of unitary construction. The door panel should be interpreted to include the stiles and the rails of a door so constructed.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Some actions are described as taken by a "user" it should be appreciated that a "user" need not be a single individual and that in some embodiments actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A door lock assembly, comprising:

an exterior lock configured to be mounted on an exterior side of a door panel; and an interior lock configured to be mounted on an interior side of the door panel and configured to function cooperatively with the exterior lock;

wherein one of the interior lock and the exterior lock includes a cover having a rear perimeter edge in abutment with the door panel when the one of the interior lock and the exterior lock is mounted on the corresponding side of the door panel; and wherein the one of the interior lock and the exterior lock includes a rear mounting wall surrounded by the rear perimeter edge of the cover and including a door panel abutting surface and a recessed surface extending between portions of the door panel abutting surface and defining a flow passage disposed between the one of the interior lock and the exterior lock and the door panel when the exterior lock and the interior lock are mounted on the corresponding sides of the door panel, the flow passage configured to vent a space bounded by the door panel, the interior lock and the exterior lock; and wherein the cover has at least one notch proximate to a distal end of at least one flow passage to allow fluid movement between the flow passage and an environment surrounding the cover.

2. The door lock assembly of claim 1, wherein the flow passage is disposed between the interior lock and the door panel when the exterior lock and the interior lock are mounted on the door panel.

3. The door lock assembly of claim 2, wherein the interior lock includes the rear mounting wall.

4. The door lock assembly of claim 3, wherein the interior lock includes a mounting bracket configured to mount the interior lock to the door panel, the mounting bracket defining the rear mounting wall.

5. The door lock assembly of claim 1, wherein the flow passage is disposed between the exterior lock and an exterior surface of the door panel.

6. The door lock assembly of claim 1, wherein the flow passage is configured to convey air and/or water.

7. The door lock assembly of claim 1, wherein the rear mounting wall includes a boss sized and shaped to be received in a bore hole in the door panel.

8. The door lock assembly of claim 7, wherein the boss is at least partially surrounded by the recessed surface.

9. The door lock assembly of claim 7, wherein the boss is at least partially surrounded by the door panel abutting surface.

10. A mount for a door lock, the mount comprising:

a mounting bracket configured to hold the door lock to a surface of a door panel, the mounting bracket including a rear mounting wall having a door panel abutting surface, a boss extending beyond the door panel abutting surface and sized and shaped to be received in a bore hole in the door panel, and one or more depressed channels extending between portions of the door panel abutting surface and configured to allow the movement of air between the surface of door panel and the door-facing side of the door lock when the door panel abutting surface is secured in contact with the surface of the door panel, thereby reducing an infiltration of air from the door-facing side of the door lock into the door lock;

wherein the boss is at least partially surrounded by the one or more depressed channels.

11. The mount of claim 10, wherein the mounting bracket is configured to be installed on an interior side of a door.

12. The mount of claim 10, wherein the door panel includes a bore hole onto which the bracket is configured to be mounted, the depressed channels in the bracket being further configured to enable movement of a fluid between the bore hole and an environment surrounding the lock.

13. The mount of claim 10, wherein the boss is at least partially surrounded by the door panel abutting surface.

14. A door, comprising:

a door panel configured to enclose a doorway of a secured space from an unsecured space;

an interior side of the door facing the secured space;

an exterior side of the door facing the unsecured space;

a bore hole in the door panel, the bore hole between the interior side of the door and the exterior side of the door;

a lock configured to mount to the door panel over the bore hole on one of the interior side of the door and the exterior side of the door;

wherein the lock includes a cover having a rear perimeter edge in abutment with the door panel and a rear mounting wall surrounded by the rear perimeter edge of the cover and including a door panel abutting surface and a recessed surface extending between portions of the door panel abutting surface and defining at least one air channel disposed between the lock and a surface of the door panel that abuts the door panel abutting surface of the rear mounting wall, the at least one air channel configured to allow air to flow between the bore hole and an environment surrounding the lock; and wherein the cover has at least one notch disposed proximate to a distal end of the at least one air channel to allow fluid movement between the at least one air channel and an environment surrounding the cover.

15. The door of claim 14, wherein the rear mounting wall includes a boss received in the bore hole in the door panel.

16. The door of claim 15, wherein the boss is at least partially surrounded by the recessed surface.

17. The door of claim 15, wherein the boss is at least partially surrounded by the door panel abutting surface.

18. The door of claim 14, wherein the lock includes a mounting bracket mounting the lock to the door panel, the mounting bracket defining the rear mounting wall.

* * * * *